US005569397A

United States Patent [19]

Tsurumaki et al.

[11] Patent Number: 5,569,397

[45] Date of Patent: Oct. 29, 1996

[54] PLASMA TORCH

[75] Inventors: Naoya Tsurumaki, Hiratsuka; Shunichi Sakuragi, Kanagawa, both of Japan

[73] Assignee: Kabushiki Kaisha Komatsu Seisakusho, Tokyo, Japan

[21] Appl. No.: 586,884

[22] PCT Filed: Jul. 25, 1994

[86] PCT No.: PCT/JP94/01218

§ 371 Date: Jan. 26, 1996

§ 102(e) Date: Jan. 26, 1996

[87] PCT Pub. No.: WO95/03910

PCT Pub. Date: Feb. 9, 1995

[30] Foreign Application Priority Data

Jul. 28, 1993 [JP] Japan .................................... 5-205821

[51] Int. Cl.[6] .................................................... B23K 10/00

[52] U.S. Cl. ................................ 219/121.51; 219/121.48; 219/121.5

[58] Field of Search ............................ 219/121.51, 121.5, 219/121.48, 121.39, 121.55, 74, 75, 121.36; 313/231.21, 231.31, 231.41

[56] References Cited

U.S. PATENT DOCUMENTS 4,954,688 9/1990 Winterfeldt .......................... 219/121.5
5,396,043 3/1995 Couch, Jr. et al. .................. 219/121.5

FOREIGN PATENT DOCUMENTS 0452494 10/1991 European Pat. Off. .
63-250097 10/1988 Japan .
1-299777 12/1989 Japan .
2-175080 7/1990 Japan .
3-174980 7/1991 Japan .

*Primary Examiner*—Mark H. Paschall
*Attorney, Agent, or Firm*—Richards, Medlock & Andrews

[57] ABSTRACT

A plasma torch can produce a uniform and intense swirl in the operating gas, and as a result further stabilize the output of the plasma jet, which results in good cutting quality, so as to extend the life of consumables or the like. This is achieved when jet ports (3) from which operating gas G is ejected are positioned such that in a transverse cross-section (2A) of a swirler (50) including the jet ports (3), a relationship between a diameter D of a swirler chamber and a minimum distance (d) from a line (2*b*), which is tangent to the diameter D of the swirler chamber and parallel to a projected line (3*c*) of an axis (3*b*) of the jet hole (3*a*), to the side end (2*c*), of the side of the jet port (3) adjacent to the tangential line (2*b*), is represented by $0<d/D\leqq 0.03$.

9 Claims, 4 Drawing Sheets

PLASMA TORCH

TECHNICAL FIELD

The present invention relates to a plasma torch used in a plasma processing machine, which cuts a material by generating a plasma jet between an electrode and the cutting material.

BACKGROUND ART

Hitherto, plasma torches have been provided with a nozzle around an electrode to form a path for an operating gas, and have generated a hot plasma jet between the electrode and the cutting material to provide a good cut quality. One of the most effective ways of increasing the output of the plasma jet is to increase the amount of discharge current by increasing the cooling effect. Increasing the size of the gap between the electrode and the nozzle in the plasma torch is another way of achieving this end. Increasing the gap size, however, produces a long arc column between the electrode and the nozzle, so that the position where the arc is generated at the nozzle side tends to vary in an irregular fashion. This often results in an unstable output. A technique which overcomes such a problem is the swirling operating gas technique. The formed swirl has a center region which is lower in pressure than its peripheral region, so that even when the aforementioned long arc column is generated, this arc column gets trapped in the aforementioned low pressure region, which prevents variations from occurring in the position where the arc is generated at the nozzle side. As a result of this, a stable output can be produced.

A known construction, of a plasma torch which forms this swirl, has a swirler disposed along the outer periphery of the electrode and a plurality of jet ports which are formed obliquely from the outer periphery to the inner periphery of the swirler, whereby the plasma torch ejects operating gas from the jet ports in a direction tangent to an inner peripheral circle of the swirler. In such a construction, however, the electrode axial component, in addition to the swirling direction component, is strongly present. Therefore, it is not easy to obtain an intense swirl, that is a swirl having a swirling component as the main component.

A plasma torch which ejects operating gas, with the aforementioned electrode axial direction component minimized, is shown in FIGS. 6 and 7. This plasma torch is constructed so that operating gas G is ejected in the horizontal direction. In other words, this plasma torch is so constructed as to have a swirler 4 disposed along the inner periphery of the upper portion of a nozzle 5; a swirler chamber 2 surrounded by an electrode 1, the swirler 4, and the nozzle 5; and a plurality of jet holes 3*a* formed in a direction tangent to an inner wall 4*a* of the swirler 4; whereby the plasma torch ejects the operating gas G from jet ports 3 of the jet holes to form a swirl S (refer to, for example, Japanese Patent Laid-Open Nos. 63-250097 and 3-174980). In the figures, reference numeral 4A denotes a transverse section of the swirler 4.

The above-described swirl technique, though an excellent technique to stabilize the plasma jet, does not provide enough stability, so that a large quantity of adhered dross (molten metal) during cutting is observed. Such plasma torches will be described with reference to FIG. 5. None of the plasma torches investigated by the inventor were found to have their jet ports arranged in accordance with a positional relationship (d/D) of d/D<0.06, like the jet ports 3 of the various plasma torches with the above-described constructions. Here, D stands for a diameter of a swirler chamber (or inner diameter of a swirler 50) in each transverse section 2A of the swirler 50 including the jet ports 3. On the other hand, d stands for a minimum distance, in each transverse cross-section 2A of the aforementioned swirler 50, from a line 2*b*, which is tangent to the diameter D of the swirler chamber and parallel to a projected line 3*c* of an axis 3*b* of the jet hole 3*a*, to a side end 2*c* of the side of the jet port 3 adjacent to the tangential line 2*b*.

SUMMARY OF THE INVENTION

Accordingly, in order to overcome such prior art problems, an object of the present invention is to provide a plasma torch whose jet ports are arranged in accordance with a specified positional relationship (d/D) which causes stabilization of the plasma jet.

To this end, according to the present invention, there is provided a plasma torch (described hereunder with reference to FIGS. 1 and 5), wherein, the jet ports 3 through which the operating gas G is ejected are positioned such that in each transverse cross-section 2A of the swirler 50 including the jet ports 3, the relationship between the diameter D of the swirler chamber and the minimum distance d from the line 2*b*, which is tangent to the diameter D of the swirler chamber and parallel to the projected line 3*c* of the axis 3*b* of the jet hole 3*a*, to the side end 2*c* on a side of the tangential line 2*b* of the jet port 3 is represented by $0 \leq d/D \leq 0.03$.

With such a construction, as shown in FIG. 1, as the jet port 3 is moved closer to an inner wall 50*a* of the swirler 50 (that is, as d/D is made smaller), the operating gas G swirls along the inner wall 50*a*. This results in less frequent air current collisions, and thus reduces the amount of kinetic energy of the air currents which is lost, so that a uniform and intense swirl S is produced.

In contrast, in the prior art construction of FIG. 7, operating gas, ejected from the jet port 3, collides against the inner wall 4*a* of the swirler 4 or collides with operating gas G from a different jet port 3, thereby making it difficult to produce a uniform and intense swirl S (see FIG. 6).

The plasma torches of the present invention and the prior art are different in the above-described way because they are constructed differently. It is the studies made by the present inventor that have revealed for the first time that d/D affects air currents (swirl strength), and especially that air currents have excellent properties in a specific range. In contrast to this, in the prior art, the positions of the jet ports 3, and more particularly the positional relationship d/D, are not very important. The positions of the jet ports are determined based on the ease with which processing can be carried out.

BEST NODE FOR CARRYING OUT THE INVENTION

A description will be given of a preferred embodiment of a plasma torch of the present invention with reference to the attached drawings.

Figure 2:
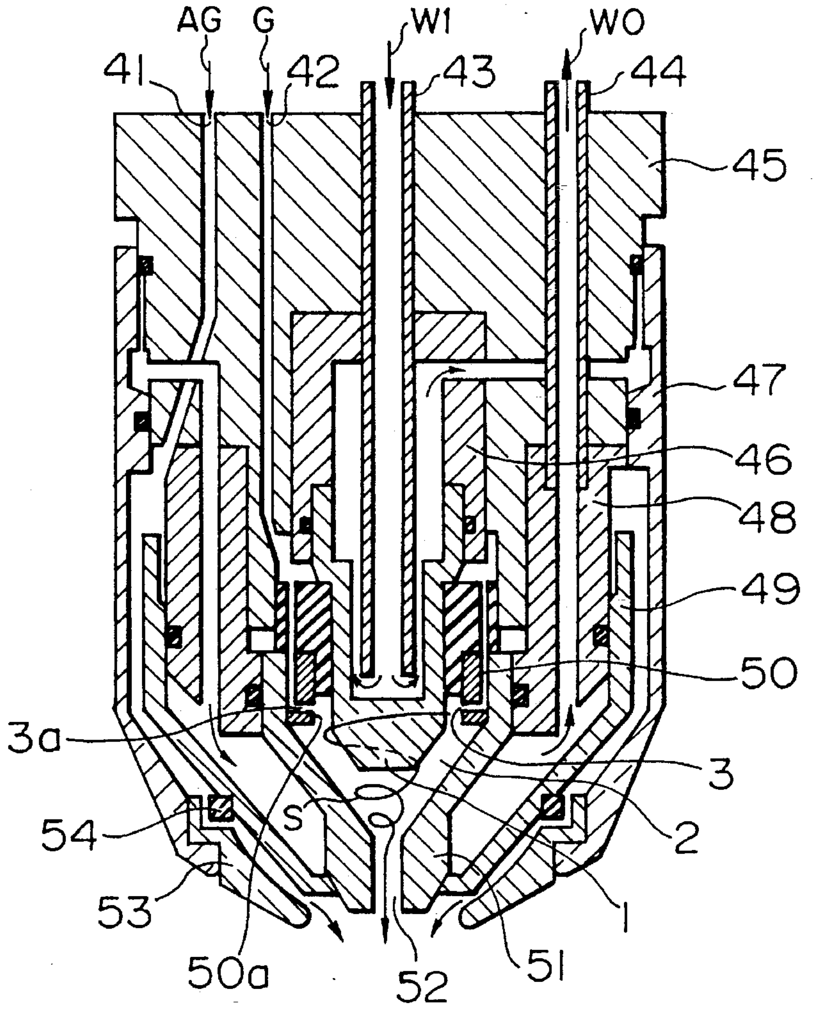
FIG. 2 is a longitudinal sectional view of a water cooling type plasma torch body including the swirler of FIG. 1.

FIG. 2 illustrates a water cooling type plasma torch in an embodiment of the present invention. The general construction of the body of the torch will be described using reference numerals. Reference numeral 41 denotes a path for assist gas AG; reference numeral 42 denotes a path for the operating gas G; reference numeral 43 denotes an inlet path for cooling water W (WI); reference numeral 44 denotes an outlet path for the cooling water (WO); reference numeral 45 denotes an upper insulating member; reference numeral 46 denotes an electrode supporting member; reference numeral 47 denotes a nozzle holder; reference numeral 48 denotes a nozzle supporting member; reference numeral 49 denotes a nozzle cap; reference 50 denotes a swirler; reference numeral 3*a* denotes a jet hole for the operating gas; reference numeral 3 denotes a jet port for the operating gas; reference numeral 1 denotes an electrode; reference numeral 2 denotes a swirler chamber; reference numeral 51 denotes a nozzle; reference numeral 52 denotes a plasma jet port; reference numeral 53 denotes a nozzle protection cap; and reference numeral 54 denotes a ring-shaped insulator. This water cooling type plasma torch has the same construction as a general prior art water cooling type plasma torch, except that there is a difference in the swirler chamber 2 and the swirler 50, and in particular the positional relationship of the jet holes 3*a* and the jet ports 3 to be described later. The swirler chamber 2, which is surrounded by the electrode 1, the swirler 50, the nozzle 5, etc., forms an operating gas swirl gap along the outer peripheral region at the front end of the electrode 1. Four jet ports 3 are formed in an inner wall 50*a* of the swirler 50.

Figure 1:
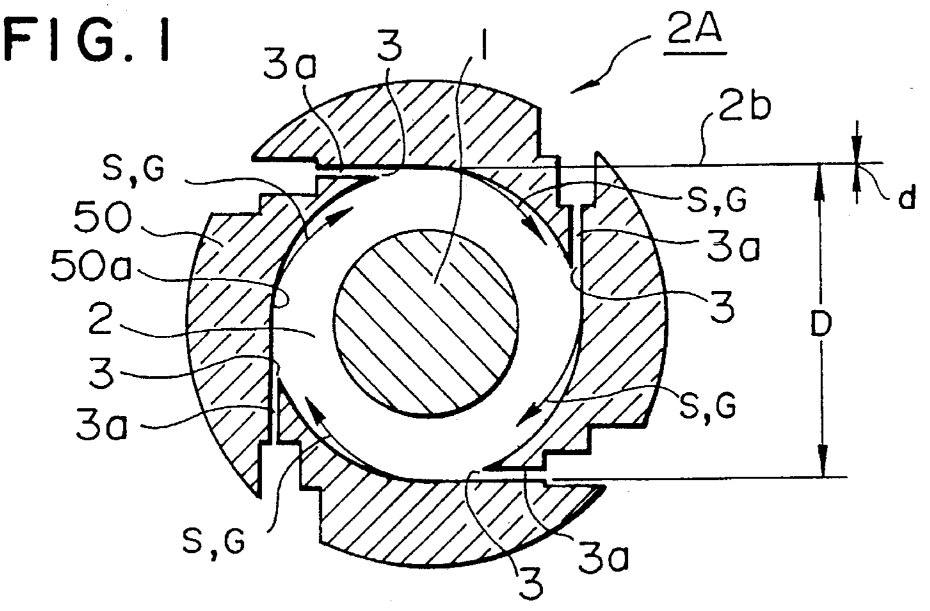
FIG. 1 is illustrative of a transverse cross-section of a swirler of a plasma torch of an embodiment in accordance with the present invention.
Figure 5:
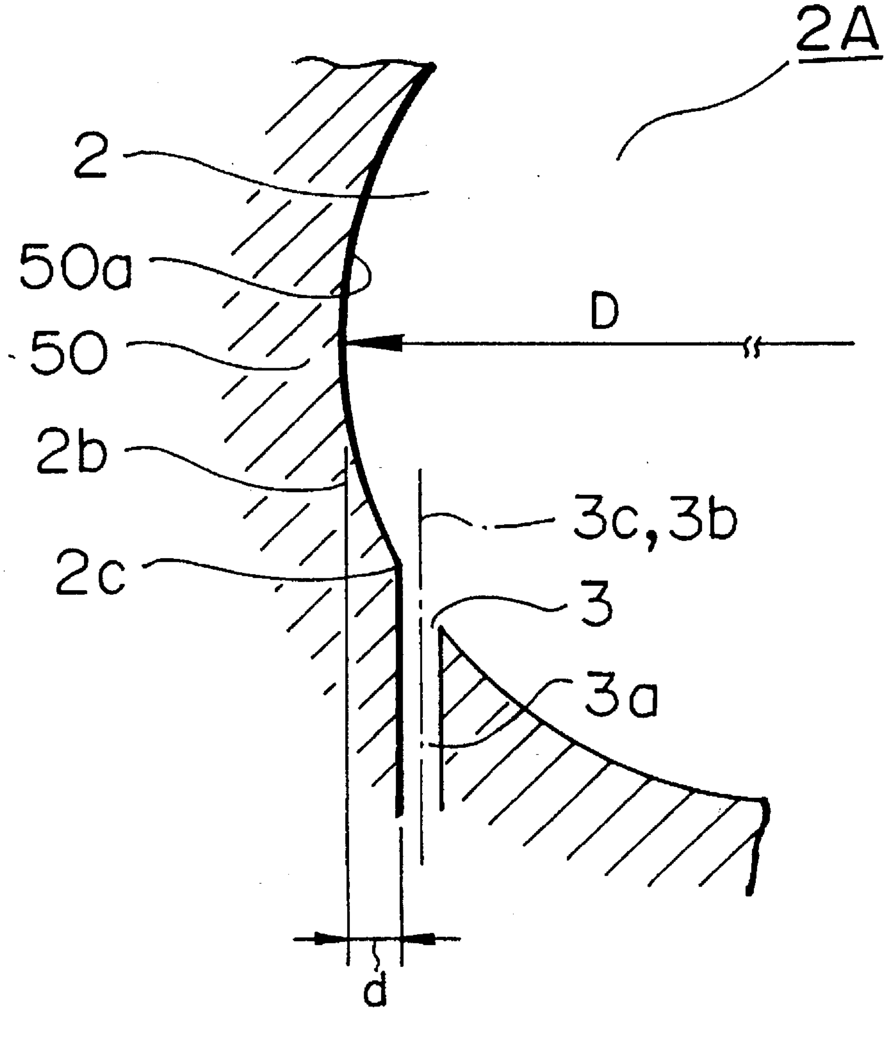
FIG. 5 is illustrative of a transverse cross-section of a critical portion of the swirler indicating a position of the jet port in accordance with the present invention.
Figure 6:
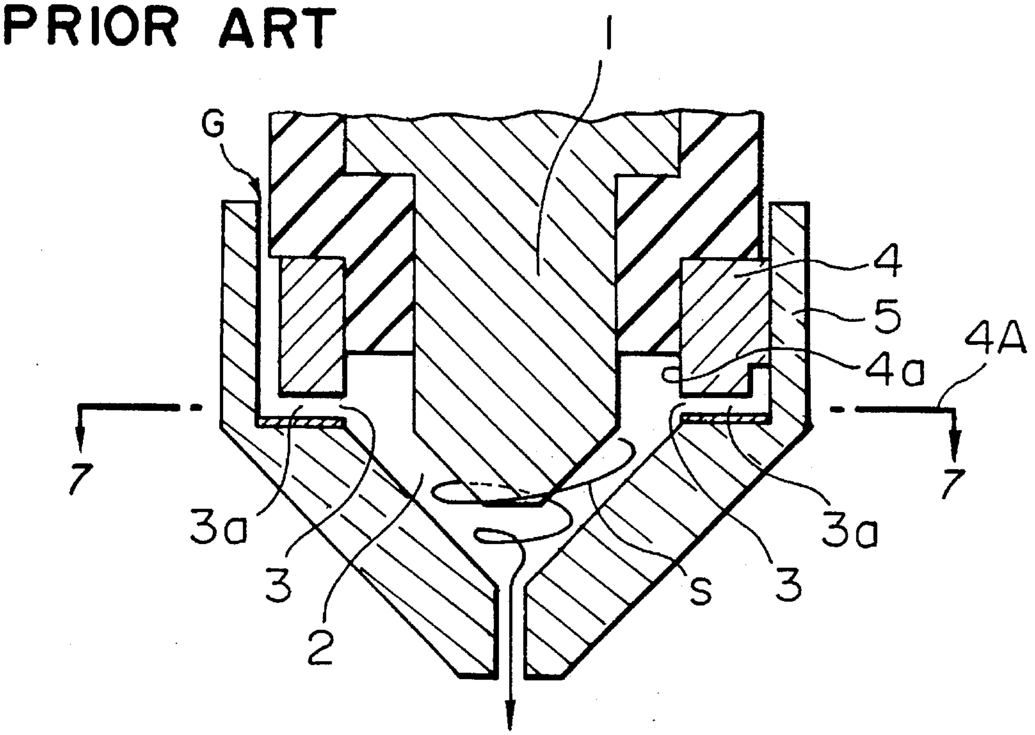
FIG. 6 PRIOR ART
FIG. 6 is a schematic transverse cross-sectional view of a critical portion of a prior art plasma torch.
Figure 7:
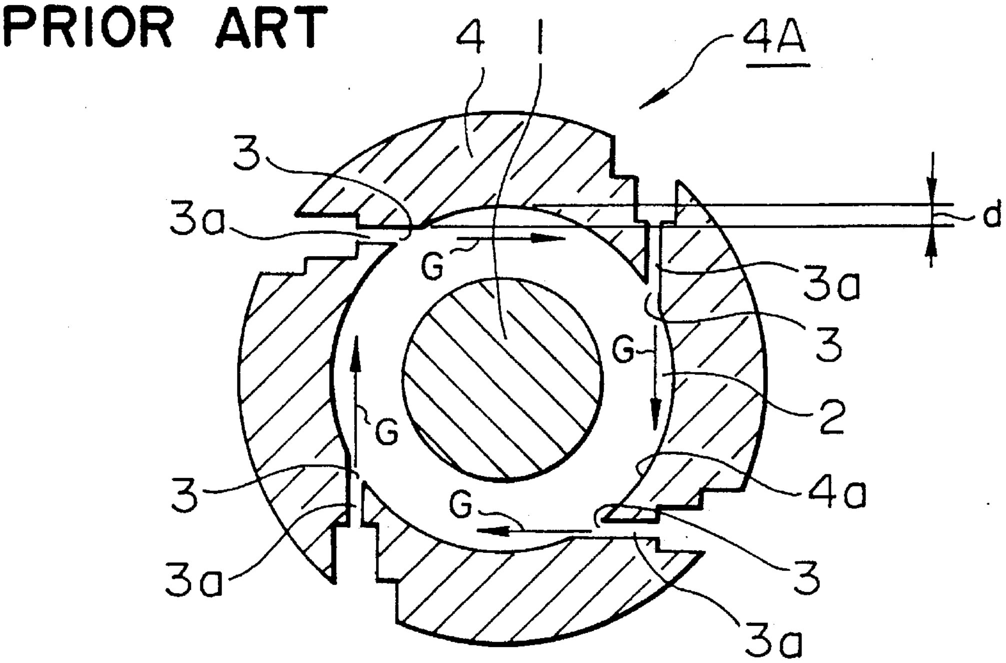
FIG. 7 PRIOR ART
FIG. 7 is illustrative of a transverse cross-section of a swirler along the 7—7 section.

The aforementioned positional relationship of the jet holes 3*a* and the jet ports 3 will be described, with reference to FIGS. 1 and 5. The positions of the four jet holes 3*a* and the jet ports 3 thereof formed in the swirler 50 are included in the same transverse cross-section 2A of the swirler 50. More specifically, each jet hole 3*a* is formed symmetrical to an axis of the electrode, with the axes 3*b* of the adjacent jet holes 3*a* forming an angle of approximately 90 degrees. The operating gas G is ejected from the jet ports 3 in the horizontal direction. The relationship between the diameter D of the swirler chamber and the minimum distance d from the line 2*b*, which is tangent to the diameter D of the swirler chamber and parallel to the axis 3*b* of the jet hole 3*a*, to the side end 2*c*, of the side of the jet port 3 adjacent to the tangential line 2*b*, is represented by d/D=0.02.

As illustrated in FIG. 2, with such a construction, the operating gas G is introduced from the path 42 and flows into the jet hole 3*a*. Then, it is ejected from the jet port 3 thereof in the horizontal direction to the swirler chamber 2 and swirls along the inner wall 50*a* of the swirler 50. This prevents the operating gas from colliding against the inner wall 50*a* as well as the already-generated swirls, so that a uniform and intense swirl S is formed. Thereafter, the swirling operating gas from a plasma jet port 52 is ejected as a plasma jet onto an external cutting material (not shown), which cuts the material very well.

Figure 3:
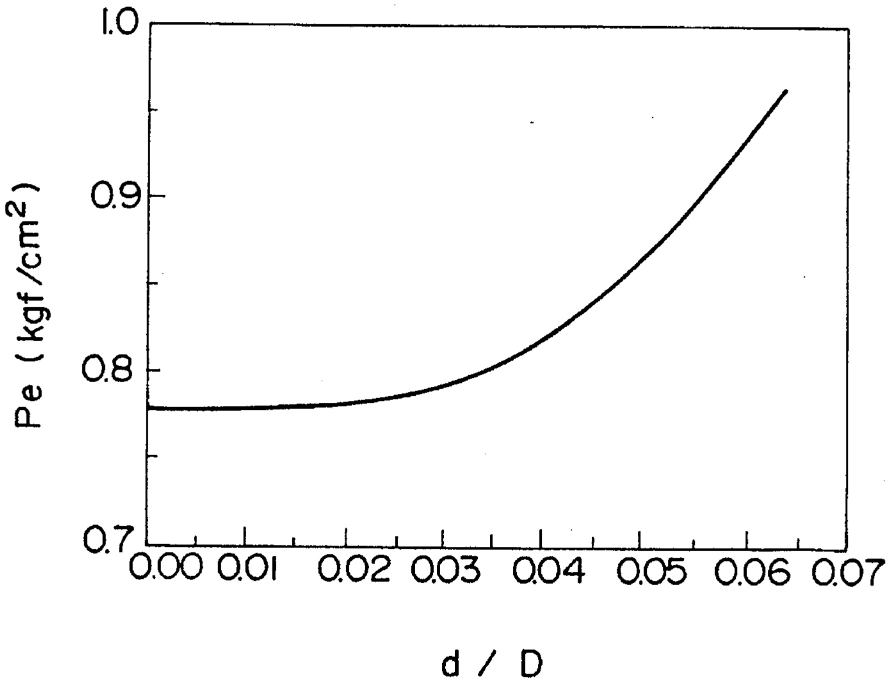
FIG. 3 is a graph showing the relationship between the positions of various jet ports in accordance with the present invention and static pressure.

Test results for the various positional relationships (d/D) of the aforementioned jet ports 3 are illustrated in FIG. 3. Although this test was performed on a plasma torch having electrode 1 fitted into a ring-shaped permanent magnet at the upper portion, the same results are obtained when this test is performed on the plasma torch of FIG. 2. The horizontal axis shows the positional relationships (d/D) of the jet ports 3, while the vertical axis indicates the static pressure Pe (in kgf/cm$^2$) right below the center of the electrode I measured under normal operating conditions. Elaborating on the description of the prior art, the larger the swirling velocity of the swirl S (or the larger the flow rate swirl component), the more the operating gas is driven outward by centrifugal force. This causes the static pressure Pe distribution to be high at the outer side and low at the central portion. Therefore, the smaller the static pressure Pe at the central portion of the plasma torch, the more intense the swirl.

From such a viewpoint, it cannot be said that the prior art makes possible the production of an intense swirl because when $d/D \geqq 0.06$, $Pe \geqq 0.9$ kgf/cm$^2$, so that Pe is large In addition, great changes in the static pressure occur within this range. On the other hand, when d/D is in a range of from 0 to 003, Pe is small in a range of from about 0.78 to 0.79 kgf/cm$^2$, within which almost no changes occur. This means that when the positional relationship (d/D) of the jet ports 3 is 0<d/D 0.03, the plasma torch of the present invention obviously produces a very stable swirl, that is a very stable output compared to prior art plasma torches When more stability is required, it is preferable that the positional relationship (d/D) is $0 < d/D \leqq 0.025$.

Figure 4:
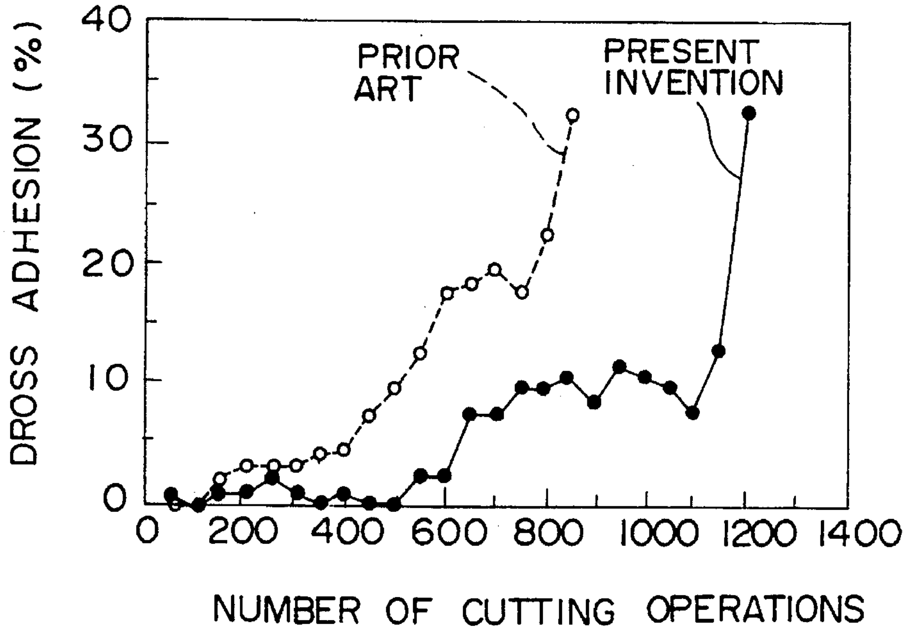
FIG. 4 is a graph showing the relationship between the number of cutting operations and dross adhesion percentage of an embodiment of the present invention and an embodiment of the prior art.

FIG. 4 illustrates the cutting quality test results for the aforementioned embodiment in which the positional relationship of the jet ports 3 is d/D=0.02 and those for the prior art in which the positional relationship of the jet ports 3 is d/D=0.06. It is to be noted that the plasma torch body of the present invention employed the same torch as that used in the aforementioned static pressure measurement test. The main cutting conditions of the test were as follows: (1) cutting material used was SPC material, (2) sheet thickness=1.6 mm, (3) current=27 amperes, (4) nozzle diameter=0.6 mm, (5) operating gas pressure=4.0 kgf/cm$^2$, and (6) cutting velocity 1.5 m/min. In the test, the material was cut a predetermined length to find out whether or not there was any dross adhesion on the lower end portion of the cut section of the material. Based on whether or not there was any adhesion, the dross adhesion percentage was obtained for every 50 cutting operations, and plotted on the graph. As is apparent from the figure, compared to the prior art, the present invention has a smaller dross adhesion percentage, so that it provides a better cutting quality. In addition, the present invention makes it possible to considerably increase the number of useful cutting operations, and extend the life of the plasma torch, in particular the electrode, nozzle, and other consumables.

It is to be understood that the plasma torch of the present invention is not limited to the foregoing embodiment. First, the plasma torch body may be so constructed as having a member with a swirl function. Therefore, it is applicable to an ordinarily used plasma torch of the water cooling type, the air cooling type, or the like. The plasma torch operates in the same way, even when the jet ports and the jet holes are not arranged symmetrical to the electrode axis, so that the number of jet ports and jet holes can be determined as required. For example, in addition to being formed on the same transverse cross-section of the swirler, some or all of the jet ports can be formed respectively at different positions with respect to the axial direction of the electrode. In another example, as has been mentioned in a discussion of "the projected line of the axis of the jet hole", in addition to being formed in the same plane of the transverse cross-section of the swirler including the jet ports, each jet hole can be formed such that its axial line is slightly inclined in the horizontal direction. Although the lower limit and the upper limit of the positional relationship (d/D) of the jet ports are $0<d/D$ and $d/D \leqq 0.03$ respectively, values falling outside these limits are obviously to be understood as being within the limits of the present invention, for example, if they result from deviations evidently due to drilling or other operational errors during the manufacturing process.

INDUSTRIAL APPLICABILITY

The present invention is effective in providing a plasma torch which can produce a uniform and intense swirl in the operating gas and as a result further stabilize the plasma jet which results in good cutting quality, so as to extend the life of consumables or the like.

What is claimed is:

1. In a plasma torch comprising:

an electrode, a swirler positioned along an outer periphery of said electrode to form a swirler chamber adjacent a front end of said electrode, said swirler having a plurality of jet holes, each of said jet holes extending through said swirler to an inner wall of said swirler so as to provide a jet port in said inner wall open to said swirler chamber, whereby operating gas can be ejected from said jet ports into said swirler chamber to produce a swirl in the operating gas in said swirler chamber, the improvement comprising:

each said jet port being positioned in said swirler such that in a transverse cross-section of said swirler including the respective jet port, a relationship represented by $0<d/D$ 0.03 exists, wherein said D is a diameter of said inner wall and said d is a distance from a line, which is tangent to said inner wall and parallel to a projected line of an axis of the respective jet hole, to a side end of a side of the respective jet port adjacent to said line which is tangent.

2. A plasma torch in accordance with claim 1, wherein said relationship is represented by $0<d/D \leqq 0.025$.

3. A plasma torch in accordance with claim 1, wherein said relationship is represented by d/D equals 0.02.

4. A plasma torch in accordance with claim 1, wherein said plurality of jet holes are formed in said swirler symmetrical to an axis of said electrode.

5. A plasma torch in accordance with claim 1, wherein each of said plurality of jet holes is formed in said transverse cross-section of said swirler.

6. A plasma torch in accordance with claim 5, wherein said relationship is represented by $0<d/D \leqq 0.025$.

7. A plasma torch in accordance with claim 5, wherein said plurality of jet holes are formed in said swirler symmetrical to an axis of said electrode.

8. A plasma torch in accordance with claim 7, wherein said relationship is represented by $0<d/D \leqq 0.025$.

9. A plasma torch in accordance with claim 7, wherein said relationship is represented by d/D equals 0.02.

* * * * *